(12) United States Patent
Eckert

(10) Patent No.: US 9,965,355 B2
(45) Date of Patent: May 8, 2018

(54) SYSTEM AND METHOD FOR DYNAMIC COLLECTION OF SYSTEM MANAGEMENT DATA IN A MAINFRAME COMPUTING ENVIRONMENT

(71) Applicant: Teracloud SA, Luxembourg (LU)

(72) Inventor: Paul J. Eckert, Newtown Square, PA (US)

(73) Assignee: TERACLOUD SA, Luxemburg (LU)

( * ) Notice: Subject to any disclaimer, the term of this patent is extended or adjusted under 35 U.S.C. 154(b) by 288 days.

(21) Appl. No.: 14/716,039

(22) Filed: May 19, 2015

(65) Prior Publication Data
US 2015/0347233 A1 Dec. 3, 2015

Related U.S. Application Data

(60) Provisional application No. 62/005,121, filed on May 30, 2014.

(51) Int. Cl.
*G06F 17/30* (2006.01)
*G06F 11/14* (2006.01)
*G06F 11/30* (2006.01)
*G06F 17/40* (2006.01)

(52) U.S. Cl.
CPC ...... *G06F 11/1415* (2013.01); *G06F 11/3072* (2013.01); *G06F 17/40* (2013.01); *G06F 2201/80* (2013.01); *G06F 2201/835* (2013.01); *G06F 2201/86* (2013.01)

(58) Field of Classification Search
CPC .................................................. G06F 11/1415
USPC ........................................................ 707/650
See application file for complete search history.

(56) References Cited

U.S. PATENT DOCUMENTS

| 7,970,946 B1 * | 6/2011 | Djabarov ............ G06F 11/3495 709/224 |
| 2006/0031719 A1 * | 2/2006 | Bower, III .......... G06F 11/0781 714/39 |
| 2010/0235494 A1 | 9/2010 | Sood et al. |

OTHER PUBLICATIONS

Search Report and Written Opinion issued in related International Application No. PCT/IB2015/000752, dated Oct. 12, 2015.
International Preliminary Report on Patentability and Written Opinion for International Application No. PCT/IB2015/000752, dated Dec. 6, 2016, 8 pages.

* cited by examiner

*Primary Examiner* — Chelcie Daye
(74) *Attorney, Agent, or Firm* — RatnerPrestia

(57) ABSTRACT

A system collects system management facility (SMF) records pertaining to jobs and processes running on a mainframe system. The SMF records are immediately available for processing after collection. The SMF records are collected from an SMF exit point and/or log stream.

19 Claims, 4 Drawing Sheets

SYSTEM AND METHOD FOR DYNAMIC COLLECTION OF SYSTEM MANAGEMENT DATA IN A MAINFRAME COMPUTING ENVIRONMENT

TECHNICAL FIELD

The present examples relate to techniques and processes for collecting SMF records immediately after the SMF records are created and prior to the SMF records being buffered to any intermediate media.

BACKGROUND

Mainframe computing is a computing platform used today by the largest companies in the world. A mainframe often processes many workloads such as accounts receivable, general ledger, payroll and a variety of applications needed for specific business requirements. These workloads are commonly referred to as applications or jobs.

A mainframe is a complex environment consisting of databases and datasets (i.e., files). These data typically reside on a direct access storage device (DASD) or disk drive. In addition to DASD, mainframe applications also rely on one or more tape drives/devices to store portions of these data. Tape drive(s) can be the primary repository of vital information within a mainframe application. Tape today can be either physical tape which must be mounted on hardware to be read or virtual tape which is disk-based storage emulating physical tape.

Mainframe computers process information in one of two modes of operation, online or batch. An online system, for example, provides an interactive application interface for interaction by customers and employees. In contrast, a batch system, for example, involves non-interactive processing of an application (e.g., generating statements) in which the application is started and runs without intervention until it completes. Both batch and online applications exist and run in predetermined cycles to automate data processing for an organization.

As a mainframe environment processes applications, event log entries are created. Each event log entry provides detailed information regarding a particular event (e.g., job initiation, dataset open, dataset close, job termination, etc.). The detailed information includes, for example, a time the event occurred, a type of the event, a status of the event, and/or other information related to the event. A system management facility (SMF) is responsible for generating and managing these event log entries. As such, event log entries are referred to as SMF records. Event log entries (e.g., SMF records), in one example, are utilized by one or more other processes executing within the mainframe environment as a way to manage the performance of the mainframe environment.

SUMMARY

What is needed, therefore, is a technique and process for collecting SMF records immediately after the SMF records are created and prior to any buffering. Each SMF record is collected via a log stream and/or exit point (e.g., SMFU8x exit point) and immediately processed.

An example of an article of manufacture described in detail below includes a non-transitory machine readable medium and a program embodied in the medium. In the article of manufacture example, execution of the program by a processor supports functions, including functions to retrieve each system event from a stream of system events, place each system event into a respective buffer of a plurality of buffers corresponding to a source of each system event, and select a system event, according to a system-wide chronological order, based on a creation time of each system event from the respective buffer of the system event. The selected system event, in one example, is only selected if the selected system event is not a single remaining event in the respective buffer.

An example of a method described in detail below includes the steps of retrieving, by a process executing on a processor, each system event from a stream of system events placing each retrieved system event into a respective buffer of a plurality of buffers corresponding to a source of the retrieved system event, and selecting a system event, according to a system-wide chronological order, based on a creation time of each system event from the respective buffer of the system event. The selected system event, in this method example, is only selected if the selected system event is not the last remaining event in the respective buffer.

A system example described in detail below includes a processor, a storage device accessible by the processor and a program in the storage device. In the system example, execution of the program by the processor configures the system to implement functions, including functions to retrieve each system event record from a stream of system event records, place each system event record into a respective buffer of a plurality of buffers corresponding to a source of each system event record, and select a system event record corresponding to a system-wide chronological order based on a creation time of each system event from the respective buffer of the system event. The selected system event record, in one example, is only selected if the selected system event is not a single remaining event in the respective buffer.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In a mainframe environment, event log entries (e.g., SMF records) are created and managed by an SMF system. In addition, other processes and/or applications may also access these SMF records in order to improve performance of the mainframe environment. In one example, a set of processes for identifying, managing and analyzing which jobs and datasets are currently and/or recently opened utilizes SMF records in order to perform these functions. In this example, a first of these processes retrieves SMF records and writes the retrieved SMF records to an SMF records dataset for subsequent access by one or more of the other processes in the set to identify, manage and analyze jobs and datasets. Subsequent access, however, is only possible, for example, after the SMF records dataset is closed by the first process. This introduces a delay between when the SMF record is initially retrieved by the first process and subsequently accessed by the one or more other processes.

Several of the examples improve the ability to subsequently access SMF records. In one example, retrieved SMF records are written to a log stream by a first process of a set of processes. The log stream, in this example, is created specifically for SMF records written by the first process. Alternatively, or in addition, SMF records are written, for example, to a common system-wide log stream by SMF. Each of these log streams (e.g., specifically created or common system-wide) allows SMF records to subsequently be accessed without delay. Although the examples focus on writing SMF records to log streams, such use of log streams is only one technique and a further example includes utilizing a cross memory facility (XCF) communication post. A second process of the set of processes then retrieves SMF records, for example, from the specifically created log stream and/or the common system-wide log stream. In this way, each SMF record is made available to the second process without delay.

Reference now is made in detail to the examples illustrated in the accompanying drawings and discussed below.

Figure 1:
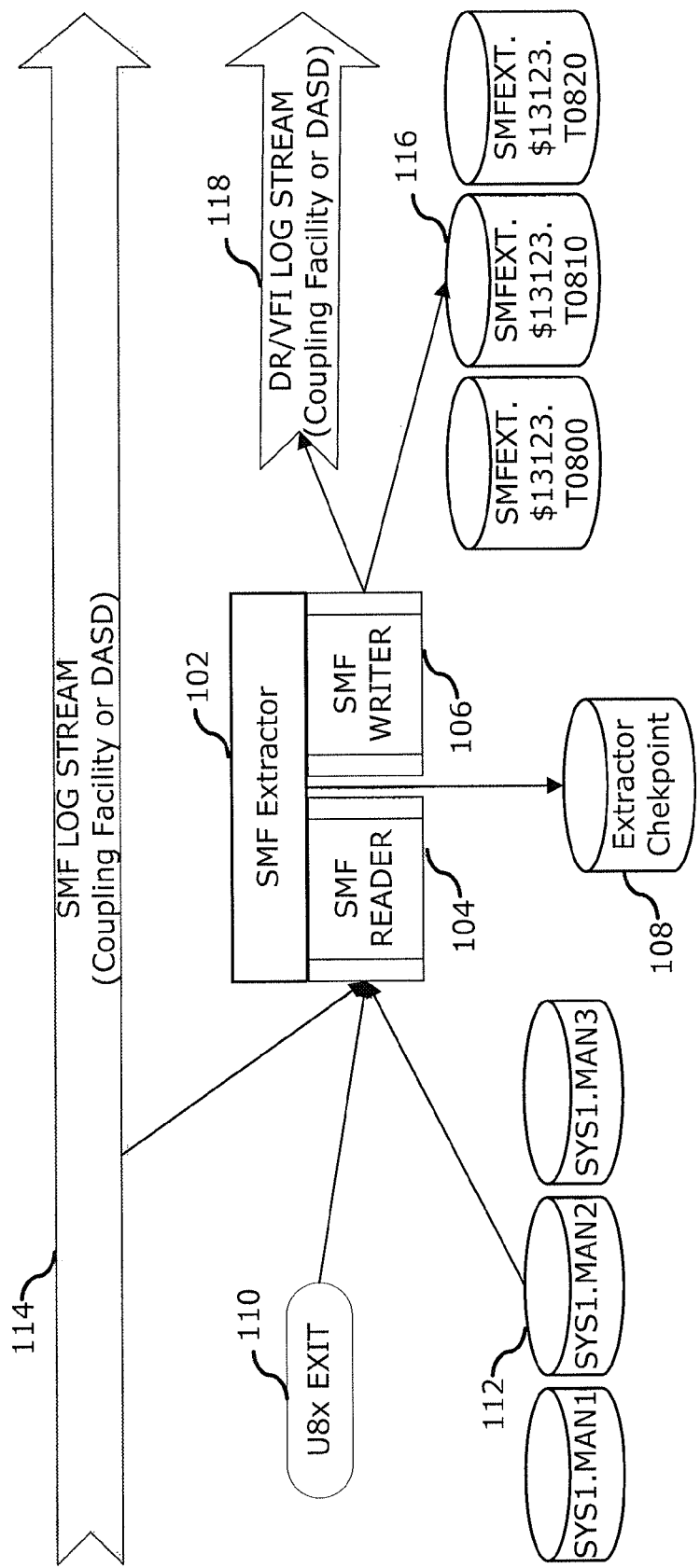
FIG. 1 is a block diagram of an example of a system for reading and writing system event record entries.

FIG. 1 illustrates an example of a system for processing previously written event log entries. In an example mainframe environment, a system management facility (SMF) call generates an SMF record corresponding to each of any number of various events occurring within the system. The various events include, for example, job initiation, job termination, job step termination, a dataset open, a dataset close or other event related to processing being performed by the mainframe environment. An SMF call, based on configuration, makes each of these SMF records available, for example, in one or more of three ways. Although FIG. 1 depicts a mainframe environment with a single system, this is only for simplicity. In various examples, a mainframe environment includes multiple systems and the processes described below related to FIG. 1 may be applied to each system within the mainframe environment.

In a first example, an SMF call makes an SMF record available via a U8x exit 110 (e.g., U83, U84, or U85). An "exit" is a hook or other link within a routine provided by or with an operating system of a mainframe environment, such as SMF. The exit within the routine allows an end-user, such as an individual, group and/or organization, to write additional commands to be processed as part of that portion of the routine. Thus, a "U8x exit" provides an opportunity for an end-user to include additional processing when an SMF record is generated.

In a second example, an SMF call writes an SMF record to one dataset of a collection of datasets 112 configured to store SMF records. This collection of datasets 112 is referred to as MAN datasets based on a common naming convention. A mainframe environment includes, for example, multiple systems operating simultaneously. Each system includes, for example, a collection of datasets 112 and each collection of datasets 112 includes one or more datasets. The collection of datasets 112 for a first system is referred to, for example, as SYS1 MANx set and the collection of datasets 112 for a second system may be referred to, for example, as SYS1 MANx set also. (x represents an integer starting with 1). So each LPAR could have a unique set of SYS1.MANx files, which is possible if the catalog for SYS1 is unique per LPAR. Alternatively, in the case of shared catalogs for SYS1 datasets, a second node of 'sysid' would be utilized to keep all MANx datasets unique. For SYS1 system, the pattern would be SYS1.SYS1.MANx and for SYS2, SYS1.SYS2.MANx.

In a third example, an SMF writes an SMF record to a common system-wide log stream 114. The log stream 114 is a portion of storage (e.g., coupling facility or DASD) accessible across all systems operating within a mainframe environment. In this way, a process executing within one system of the mainframe environment can access, for example, an SMF record written by an SMF of another system of the mainframe environment. In this example, SMF extractor 102, described further below, may not need to be utilized.

An SMF call operates within a single system of a mainframe environment. If a mainframe environment includes multiple systems, for example, an SMF call for each system operates within each system (e.g., a mainframe with three systems operates three SMFs). An SMF call of each system is configured, for example, to generate each SMF record in any one, two or all three ways described above. That is, each SMF record may be recorded in a man dataset 112, may be made available via a U8x exit 110, and/or may be written to an SMF log stream 114.

SMF extractor 102 includes, for example, SMF reader 104 and SMF writer 106. SMF reader 104 is a process that retrieves SMF records, for example, from a U8x exit 110, a man dataset 112 and/or an SMF log stream 114. SMF reader 104 passes each retrieved SMF record to SMF writer 106. SMF writer 106, in turn, writes each SMF record to either of two destinations.

In a first example, SMF writer 106 writes each SMF record to an SMF$ dataset 116. Although FIG. 1 depicts three SMF$ datasets, no such requirement exists for a particular number of datasets and this is only for simplicity. The number of SMF$ datasets written to by SMF writer 106 is configurable. In this example, SMF records written to a current SMF$ dataset cannot be retrieved by any other process as long as SMF writer 106 continues to write additional SMF records to the current SMF$ dataset. As such, SMF writer 106 will only write SMF records to the current SMF$ dataset for a period of time (e.g., 10 minutes). After the period of time elapses, for example, SMF writer 106 will transition to writing SMF records to a new SMF$ dataset and the current SMF$ dataset is available for other processes to retrieve SMF records from the current SMF$ dataset. Hence, as depicted in FIG. 1, each SMF$ dataset is named in accordance with a timestamp (e.g., SMFEXT.$13123.T0800, SMFEXT.$13123.T0810, SMFEXT.$13123.T0820) and the collection of datasets is generally referred to as the SMF$ datasets 116. However, this limitation of precluding retrieval from an SMF$ dataset while SMF writer 106 is writing to the SMF$ dataset introduces a delay equal to the period of time (e.g., 10 minutes) in when SMF records become available to another process.

In a second example, SMF writer writes each SMF record to a log stream 118 created specifically to receive SMF records from SMF writer 106. Unlike the SMF$ datasets 116, other processes may retrieve SMF records from this log stream 118 while SMF writer 106 continues to write SMF records to the log stream 118. In this way, there is little or no delay in when SMF records become available to another process.

SMF extractor 102 also includes, for example, extractor checkpoint 108. Extractor checkpoint 108 is a dataset, for example, utilized by SMF extractor 102 to track which SMF records have been retrieved by SMF reader 104 and written by SMF writer 106.

Figure 2:
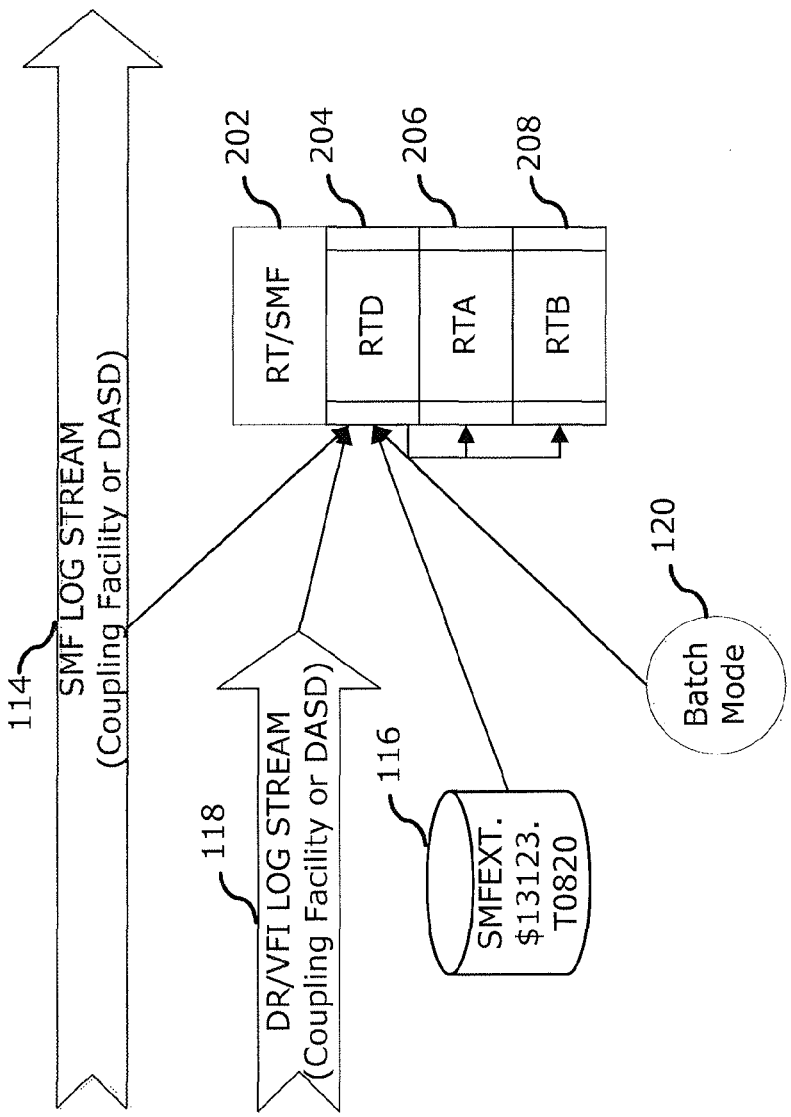
FIG. 2 is a block diagram of an example of a system for processing previously written system event record entries.

FIG. 2 illustrates an example of a system for processing previously written event log entries. As described above in relation to FIG. 1, SMF records may be written to an SMF log stream 114 by an SMF event and/or may be written by SMF writer 106 to SMF$ datasets 116 and/or a log stream 118 specifically created for writing SMF records by SMF writer 106. In addition, previously generated SMF records may be collected, for example, in a batch dataset 120. Real Time (RT)/SMF 202 is a process for retrieving previously written SMF records from any one and/or some combination of SMF log stream 114, SMF$ datasets 116, log stream 118, and batch dataset 120 as well as processing the retrieved SMF records in order to improve performance and/or reliability of a mainframe environment. In some examples, if event log entries are written to SMF log stream 114, RT/SMF 202 may retrieve the written event log entries without utilization of SMF extractor 102, as discussed above.

In one example, RT/SMF 202 includes three sub-tasks: RT dispatcher (RTD) 204; RT Analysis (RTA) 206; and RT Backup (RTB) 208. Although FIG. 2 depicts RT/SMF 202 as including these three sub-tasks, this is only for simplicity and RT/SMF 202 may include any number of additional sub-tasks.

RTD 204, in this example, is a sub-task that retrieves each previously written SMF record and dispatches each retrieved SMF record to one or more other sub-tasks (e.g., RTA 206, RTB 208, etc.) appropriately based on the type of each retrieved SMF record. RTD 204 retrieves each previously written SMF record, for example, as each SMF record is made available. The order each SMF record is made available, however, may not correspond to a system-wide chronological order based on a creation time of each SMF record. In one example, RTD 204 must only dispatch SMF records corresponding to the system-wide chronological order based on the creation time of each SMF record. As such, RTD 204 buffers, for example, retrieved SMF records and dispatches select SMF records in chronological order, as described in greater detail below in relation to FIG. 3.

RTA 206 and RTB 208 are sub-tasks, for example, that receive selected SMF records dispatched by RTD 204 and perform processing of the received SMF records. In one example, RTA 206 is an analysis process related to current and historical status of jobs and datasets within the mainframe environment. In another example, RTB 208 is a process related to monitoring and managing the status of dataset backups.

As described above, each SMF record corresponds to a system event and each SMF record includes a type corresponding to the type of system event (e.g., job initiation, job termination, dataset open, dataset close, etc.). In one example, RTA 206 receives dispatched SMF records of certain types while RTB 208 receives dispatched SMF records of different types. In a further example, the types of dispatched records received by RTA 206 are distinct and different from the types of dispatched records received by RTB 208 (e.g., RTA 206 receives only job-related SMF records and RTB 208 receives only dataset-related SMF records). Alternatively, both sub-tasks receive some dispatched records in common while one sub-task receives some distinct and different dispatched records (e.g., RTA 206 and RTB 208 both receive job termination type records while only RTA 206 receives all other types of records). Once each sub-task (e.g., RTA 206, RTB 208, etc.) receives a dispatched SMF record, the sub-task performs appropriate processing related to the received SMF record.

Figure 3:
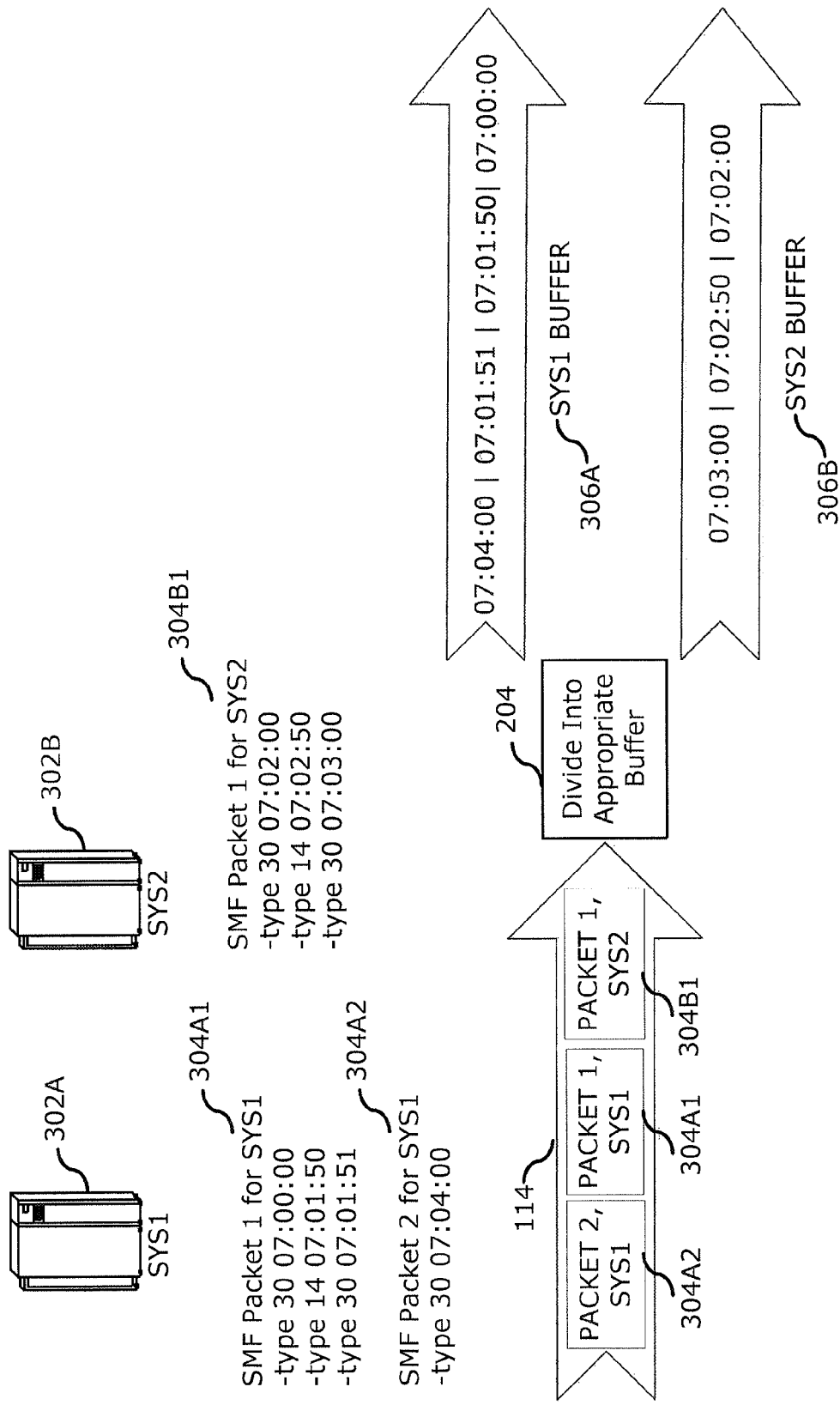
FIG. 3 is a block diagram of an example of a system for demultiplexing individual system event record entries from packets of event log entries.

FIG. 3 illustrates an example of a system for demultiplexing individual event log entries from packets of event log entries. As discussed above, RTD 204, in some examples, dispatches retrieved SMF records to various sub-tasks, such as RTA 206 and RTB 208, in a system-wide chronological order. RTD 204, however, retrieves SMF records as the records become available and not, in some examples, in the system-wide chronological order. As such, RTD 204, for example, buffers retrieved SMF records and selects buffered SMF records according to their system-wide chronological order.

Although FIG. 3 depicts a mainframe environment including two systems (e.g., SYS1 302A and SYS2 302B), this is only for simplicity and a mainframe environment may include any number of systems. In one example, each system 302A, 302B within a mainframe environment generates event log entries (e.g., SMF records) corresponding to a chronological order of the mainframe environment. As described above, event log entries for each system 302A, 302B are generated by an SMF within each system. When an SMF within SYS1 302A generates SMF records, for example, the generated SMF records are buffered and placed in the log stream 114 as a packet, such as SMF packet for SYS1 304A1. When an SMF within SYS2 302B generates SMF records, for example, the generated SMF records are buffered and placed in the log stream 114 as another packet, such as SMF packet for SYS2 304B1. As additional SMF records are generated and buffered, additional packets are placed in the log stream 114. For example, the SMF within SYS1 302A places additional buffered SMF records in log stream 114 as part of SMF packet 304A2. Each system 302A, 302B places each SMF packet 304A1, 304B1, 304A2 in log stream 114 independently of any other system. As such, SMF packet 304B1 may be placed in log stream 114 before SMF packet 304A1 or SMF packet 304A2, in one example, even though SMF records in SMF packet 304A1 occurred in a chronological order before SMF records in SMF packet 304B1.

In this example, RTD 204 retrieves SMF packet 304B1, including later generated SMF records, before SMF packet 304A1, including earlier generated SMF records. RTD 204, in order to restore chronological order to the SMF records, maintains, for example, a plurality of buffers 306A, 306B. Each buffer 306A, 306B corresponds to each system 302A, 302B. That is, buffer 306A corresponds to SYS1 302A and buffer 306B corresponds to SYS2 302B. As RTD 204 retrieves each SMF packet 304B1, 304A1, 304A2, RTD 204 places the SMF records from each SMF packet into the corresponding buffer (e.g., SMF records from SMF packet 30481 are placed in SYS2 buffer 306B and SMF records from SMF packets 304A1, 304A2 are placed in SYS1 buffer 306A). Then, RTD 204 selects, for example, an SMF record according to a chronological order of the mainframe environment based on the creation time of each SMF record from the respective buffer (e.g., the SMF record with the creation time of 07:00:00 from SYS1 buffer 306A). RTD 204 continues, for example, to select SMF records corresponding to the chronological order from the respective buffers.

As RTD 204 continues to select SMF records from buffers 306A, 306B, one buffer may be emptied before another buffer. Because subsequent SMF records corresponding to the now emptied buffer, but generated chronologically earlier, may be delivered to RTD 204 after SMF records corresponding to the non-empty buffer, but generated chronologically later, if RTD 204 is allowed to continue to select SMF records from the non-empty buffer, it is possible that SMF records will be dispatched that are not in chronological order. In one example, RTD 204 only continues to select SMF records corresponding to the chronological order from the respective buffers if the selected SMF record is not the last remaining SMF record in the respective buffer. If the selected SMF record is the last remaining SMF record in the respective buffer, RTD 204, in this example, waits until one or more additional SMF records are placed in the respective buffer. In an alternate example, RTD 204 selects the last remaining SMF record in the respective buffer and waits until one or more additional SMF records are placed in the now empty buffer before selecting the next SMF record from any buffer. In this way, chronological order of the dispatched SMF records is ensured.

Figure 4:
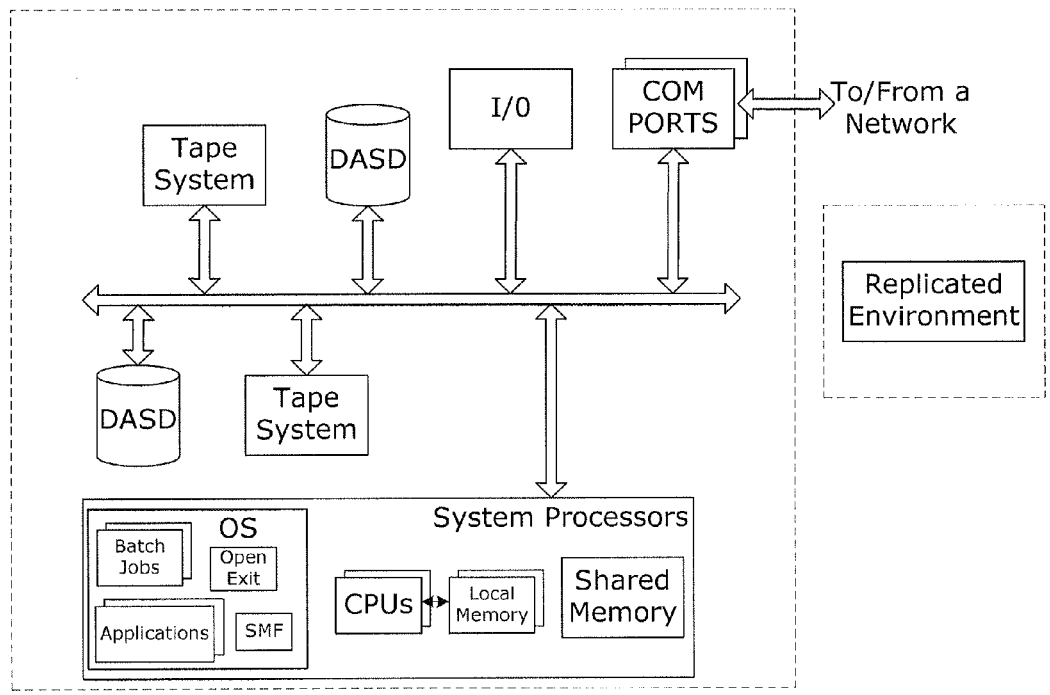
FIG. 4 is a simplified functional block diagram of a computer that may be configured as a server and/or mainframe.
Figure 5:
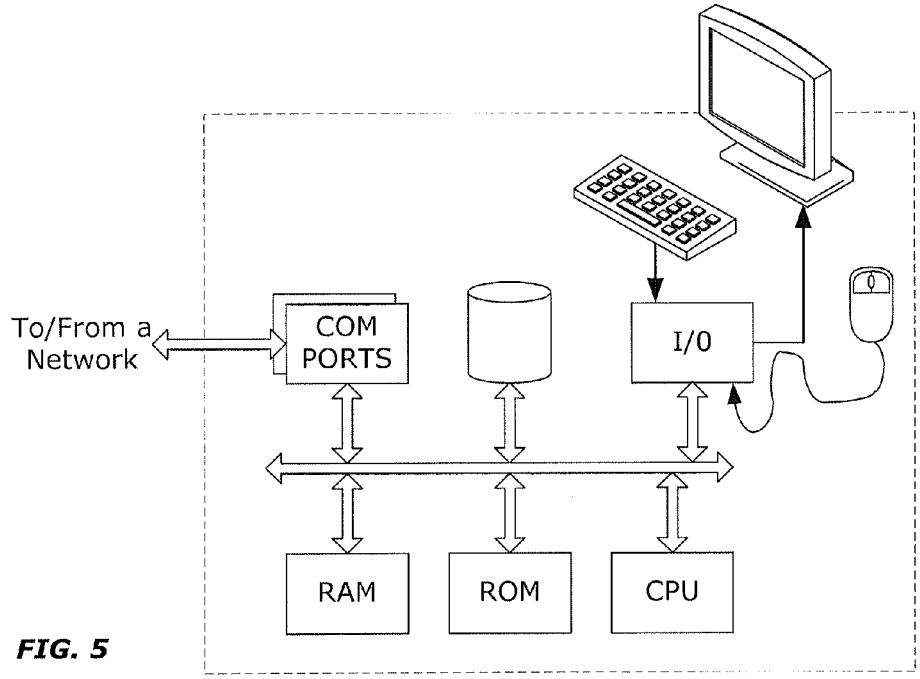
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server and/or mainframe. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A mainframe, for example, includes a data communication interface for packet data communication and an input/output (I/O) controller. The I/O controller manages communication to various I/O elements and storage facilities. Storage facilities include one or more direct access storage devices (DASD) and/or one or more tape systems. Such storage facilities provide storage for data, jobs for managing batch processing and applications. The mainframe includes an internal communication bus providing a channel of communication between the communications ports, the I/O controller, and one or more system processors. Each system processor includes one or more central processing units (CPUs) and local memory corresponding to each CPU, as well as shared memory available to any CPU. An operating system (OS) executed by the system processors manages the various jobs and applications currently running to perform appropriate processing. The OS also provides a system management facility (SMF) and open exit points for managing the operation of the mainframe and the various jobs and applications currently running. The hardware elements, operating systems, jobs and applications of such mainframes are conventional in nature. Of course, the mainframe functions may be implemented in a distributed fashion on a number of similar platforms, to distribute the processing load, and/or replicated across one or more similar platforms, to provide redundancy for the processing. As such, FIG. 4 also depicts a replicated environment. Although details of the replicated environment are not depicted, such replicated environment typically contains similar components as already described in relation to the primary mainframe of FIG. 4.

A computer type user terminal device, such as a PC, similarly includes a data communication interface CPU, main memory and one or more mass storage devices for storing user data and the various executable programs. The various types of user terminal devices will also include various user input and output elements. A computer, for example, may include a keyboard and a cursor control/selection device such as a mouse, trackball, or touchpad; and a display for visual outputs. The hardware elements, operating systems and programming languages of such user terminal devices also are conventional in nature.

Hence, aspects of the methods for recording the time each step within a job executing within a mainframe computing environment begins and ends outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through a global information network (e.g. the Internet®) or various other telecommunication networks. Such communications, for example, may enable loading of the software from one computer or processor into another, for example, from a management server or host computer such as proxy server 306 into the mainframe platform that will execute the various jobs. Thus, another type of media that may bear the software elements includes optical, electrical and electromagnetic waves, such as used across physical interfaces between local devices, through wired and optical landline networks and over various air-links. As used herein, unless restricted to non-transitory, tangible "storage" media, terms such as computer or machine "readable medium" refer to any medium that participates in providing instructions to a processor for execution.

Non-volatile storage media include, for example, optical or magnetic disks, such as any of the storage devices in any computer(s) or the like, such as may be used to hold datasets and programs for enterprise applications. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge or any other medium from which a computer can read programming code and/or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   a processor;
   a storage device accessible by the processor;
   a real time analytics program in the storage device; and
   a real time dispatcher program in the storage device, wherein:
   execution of the real time dispatcher program by the processor configures the system to implement functions, including functions to:
     retrieve, from a collection of previously generated system event records, a sequence of system event records, wherein each system event record:
       was previously generated at least in part as a result of an event occurring within the system;
       includes an indication of a creation time of the respective system event record and an indication of a source of the respective system event record; and
       was collected independently of the respective creation time or the respective source such that the respective system event record may have been collected before another earlier generated system event record;
     for each retrieved system event record:
       identify the source of the respective retrieved system event record; and
       place the respective retrieved system event record into one buffer of a plurality of buffers, the one buffer corresponding to the source of the respective system event record; and
     for each buffered system event record:
       retrieve the respective buffered system event record from the respective buffer only if:
         the respective creation time of the respective buffered system event record corresponds to a system-wide chronological order such that the respective buffered system event record is retrieved only after any other earlier generated system event records have been retrieved; and
         either:
           the respective buffered system event record is not a single remaining buffered system event record in the respective buffer; or
           each of the other buffers contains at least one buffered system event record; and
         dispatch a copy of the respective retrieved buffered system event record to the real time analytics program in accordance with the system-wide chronological order; and
   execution of the real time analytics program by the processor configures the system to implement functions, including functions to:
     receive dispatched copies of system event records in accordance with the system-wide chronological order; and
     produce, based at least in part on the received copies of system event records, analytics regarding events occurring within the system.

2. The system of claim 1, further comprising a real time backup analysis program, wherein:
   further execution of the real time dispatcher program further configures the system to implement further functions, including functions to:
     for each retrieved buffered system event record:
       determine whether the respective retrieved buffered system event record corresponds to a particular type of event occurring within the system; and
       upon a determination that the respective retrieved buffered system event record corresponds to the particular type of event occurring within the system, dispatch another copy of the respective retrieved buffered system event record to the real time backup analysis program; and
   execution of the real time backup analysis program by the processor configures the system to implement functions, including functions to:
     receive dispatched copies of system event records; and
     determine, based at least in part on the received copies of system event records, whether one or more datasets within the system should be backed up.

3. The system of claim 2, wherein the particular type of event is a dataset close.

4. The system of claim 1, wherein the collection of previously generated system event records includes at least one of:
   system event records provided via a common log stream;
   system event records provided via a log stream created specifically to provide system event records to the real time dispatcher program;
   system event records provided via one or more datasets created specifically to provide system event records to the real time dispatcher program; and
   system event records provided via a batch dataset.

5. The system of claim 4, further comprising a system event record extractor program, wherein:
   execution of the system event record extractor program configures the system to implement functions, including functions to:

read individual system event records from at least one of:
  the common log stream;
  a result of a user exit; and
  one or more common datasets created to store system event records;
write each individual system event record to the collection of previously generated system event records; and
record, in an extractor checkpoint dataset, an indication that each read system event record has been written to the collection of previously generated system event records.

6. The system of claim 5, wherein the user exit includes one of:
  a user exit configured to control writing any system event record to the one or more common datasets created to store system event records;
  a user exit configured to control writing selected system event records to the one or more common datasets created to store system event records; and
  a user exit invoked in cross memory mode and configured to control writing selected system event records to the one or more common datasets created to store system event records.

7. The system of claim 1, further comprising at least two logical partitions wherein the indication of the source of the respective system event record includes an indication of the logical partition corresponding to the respective system event record.

8. An article of manufacture, comprising:
a non-transitory machine readable medium;
a real time analytics program embodied in the medium; and
a real time dispatcher program embodied in the medium, wherein:
execution of the real time dispatcher program by a processor supports functions, including functions to:
  retrieve, from a collection of previously generated event records, a sequence of event records, wherein each event record:
    was previously generated at least in part as a result of an event occurring within a system comprising the processor;
    includes an indication of a creation time of the respective event record and an indication of a source of the respective event record; and
    was collected independently of the respective creation time or the respective source such that the respective event record may have been collected before another earlier generated event record;
  for each retrieved event record:
    identify the source of the respective retrieved event record; and
    place the respective retrieved event record into one buffer of a plurality of buffers, the one buffer corresponding to the source of the respective event record; and
  for each buffered event record:
    retrieve the respective buffered event record from the respective buffer only if:
      the respective creation time of the respective buffered event record corresponds to a system-wide chronological order such that the respective buffered event record is retrieved only after any other earlier generated event records have been retrieved; and
    either:
      the respective buffered event record is not a single remaining buffered event record in the respective buffer; or
      each of the other buffers contains at least one buffered event record; and
    dispatch a copy of the respective retrieved buffered event record to the real time analytics program in accordance with the system-wide chronological order; and
execution of the real time analytics program by the processor supports functions, including functions to:
  receive dispatched copies of event records in accordance with the system-wide chronological order; and
  produce, based at least in part on the received copies of event records, analytics regarding events occurring within the system.

9. The article of claim 8, further comprising a real time backup analysis program embodied in the medium, wherein:
further execution of the real time dispatcher program by the processor supports further functions, including functions to:
  for each retrieved buffered event record:
    determine whether the respective retrieved buffered event record corresponds to a particular type of event occurring within the system; and
    upon a determination that the respective retrieved buffered event record corresponds to the particular type of event occurring within the system, dispatch another copy of the respective retrieved buffered event record to the real time backup analysis program; and
execution of the real time backup analysis program by the processor supports functions, including functions to:
  receive dispatched copies of event records; and
  determine, based at least in part on the received copies of event records, whether one or more datasets within the system should be backed up.

10. The article of claim 9, wherein the particular type of event is a dataset close.

11. The article of claim 8, wherein the collection of previously generated event records includes at least one of:
  event records provided via a common log stream;
  event records provided via a log stream created specifically to provide event records to the real time dispatcher program;
  event records provided via one or more datasets created specifically to provide event records to the real time dispatcher program; and
  event records provided via a batch dataset.

12. The article of claim 11, further comprising an event record extractor program embodied in the medium, wherein:
execution of the event record extractor program by the processor supports functions, including functions to:
  read individual event records from at least one of:
    the common log stream;
    a result of a user exit; and
    one or more common datasets created to store event records;
  write each individual event record to the collection of previously generated event records; and
  record, in an extractor checkpoint dataset, an indication that each read event record has been written to the collection of previously generated event records.

13. The article of claim 12, wherein the user exit includes one of:

a user exit configured to control writing any system event record to the one or more common datasets created to store system event records;
a user exit configured to control writing selected system event records to the one or more common datasets created to store system event records; and
a user exit invoked in cross memory mode and configured to control writing selected system event records to the one or more common datasets created to store system event records.

14. A method, comprising:
retrieving, by a real time dispatcher process executing on a processor and from a collection of previously generated system event records, a sequence of system event records, wherein each system event record:
was previously generated at least in part as a result of an event occurring within a system comprising the processor;
includes an indication of a creation time of the respective system event record and an indication of a source of the respective system event record; and
was collected independently of the respective creation time or the respective source such that the respective system event record may have been collected before another earlier generated system event record;
for each retrieved system event record:
identifying the source of the respective retrieved system event record; and
placing the respective retrieved system event record into one buffer of a plurality of buffers, the one buffer corresponding to the source of the respective system event record; and
for each buffered system event record:
retrieving the respective buffered system event record from the respective buffer only if:
the respective creation time of the respective buffered system event record corresponds to a system-wide chronological order such that the respective buffered system event record is retrieved only after any other earlier generated system event records; and
either:
the respective buffered system event record is not a single remaining buffered system event record in the respective buffer; or
each of the other buffers contains at least one buffered system event record; and
dispatching, to a real time analytics process executing on the processor and in accordance with the system-wide chronological order, a copy of the respective retrieved buffered system event record; and
producing, by the real time analytics process and based at least in part on the received copies of system event records, analytics regarding events occurring within the system.

15. The method of claim 14, further comprising:
for each retrieved buffered event record:
determining, by the real time dispatcher process, whether the respective retrieved buffered system event record corresponds to a particular type of event occurring within the system; and
upon a determination that the respective retrieved buffered system event record corresponds to the particular type of event occurring within the system, dispatching, to a real time backup analysis process executing on the processor, another copy of the respective retrieved buffered system event record; and
determining, by the real time backup analysis process and based at least in part on the received copies of system event records, whether one or more datasets within the system should be backed up.

16. The method of claim 15, wherein the particular type of event is a dataset close.

17. The method of claim 14, wherein the collection of previously generated event records includes at least one of:
event records provided via a common log stream;
event records provided via a log stream created specifically to provide event records to the real time dispatcher program;
event records provided via one or more datasets created specifically to provide event records to the real time dispatcher program; and
event records provided via a batch dataset.

18. The method of claim 17, further comprising:
reading, by an event record extractor process executing on the processor, individual system event records from at least one of:
the common log stream;
a result of a user exit; and
one or more common datasets created to store event records;
writing each individual system event record to the collection of previously generated system event records; and
recording, in an extractor checkpoint dataset, an indication that each read event record has been written to the collection of previously generated system event records.

19. The method of claim 18, wherein the user exit includes one of:
a user exit configured to control writing any system event record to the one or more common datasets created to store system event records;
a user exit configured to control writing selected system event records to the one or more common datasets created to store system event records; and
a user exit invoked in cross memory mode and configured to control writing selected system event records to the one or more common datasets created to store system event records.

* * * * *